Figure 4:
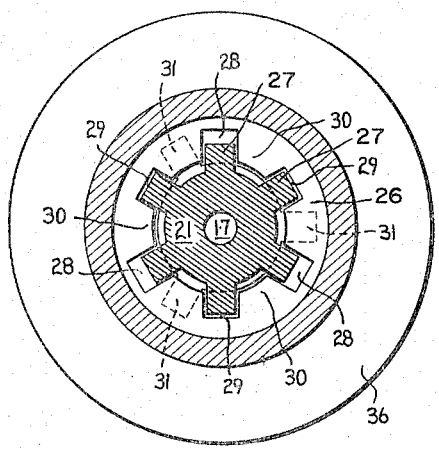

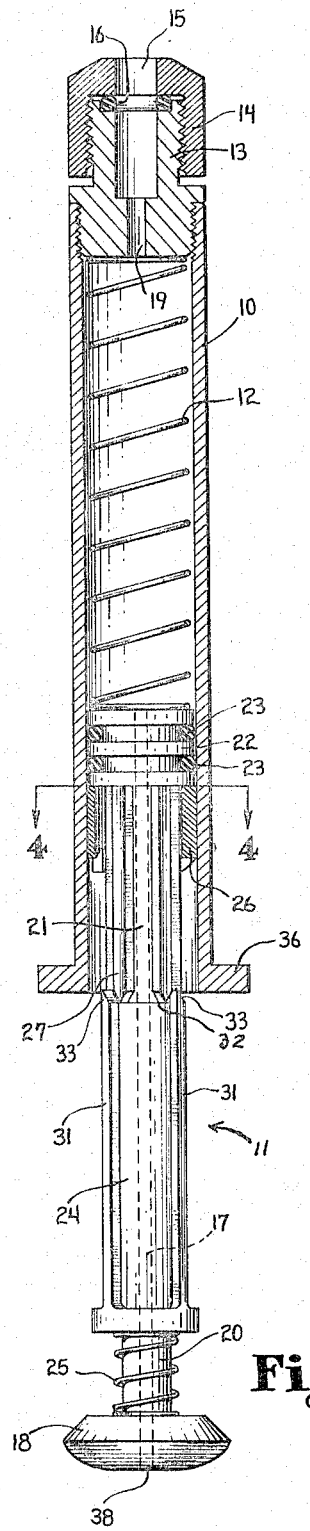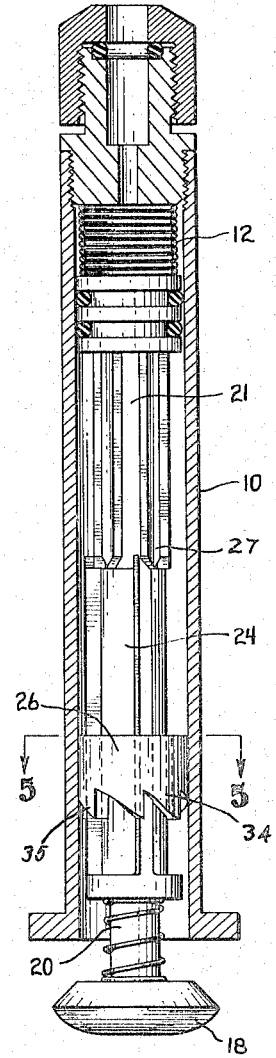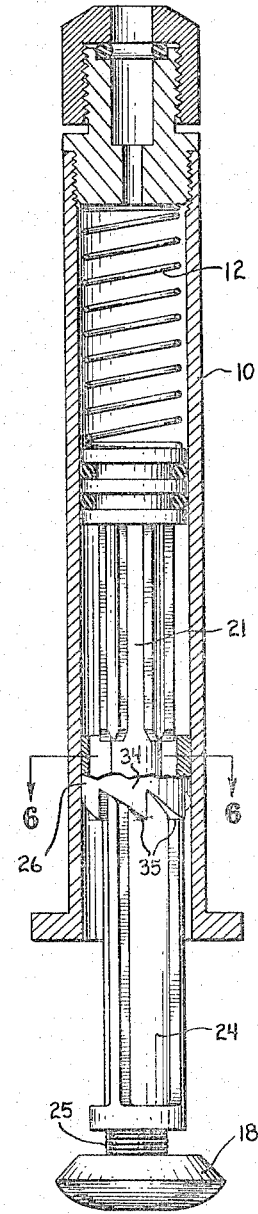
Fig. 1.
Fig. 2.
Fig. 3.
INVENTOR.
ALFRED R. PURSELL
BY Edward E. Schelling
Agent INVENTOR.
ALFRED R. PURSELL
BY Edward E. Schilling
Agent

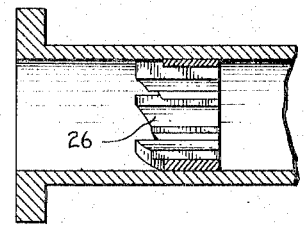
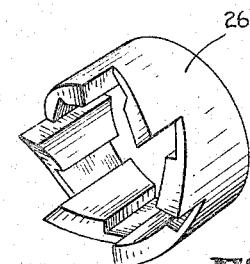
Fig. 10.    Fig. 11.
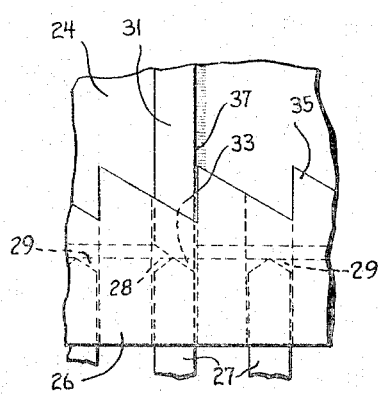
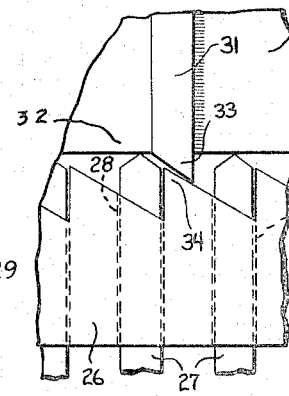
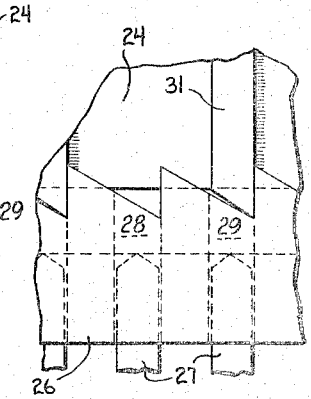
Fig. 12.    Fig. 13.    Fig. 14.
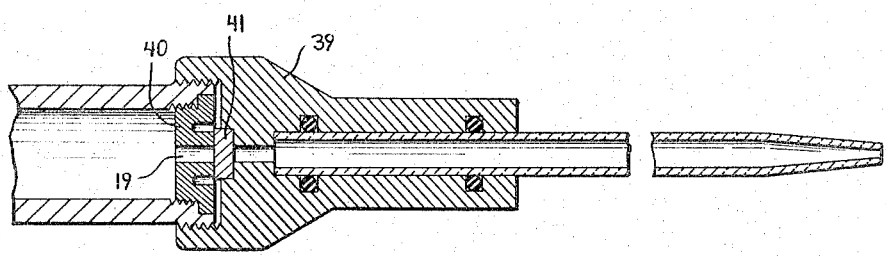
Fig. 15.
INVENTOR.
ALFRED R. PURSELL
BY Edward E. Schelling
Agent

United States Patent Office 3,302,462
Patented Feb. 7, 1967

3,302,462
PIPETTING DEVICE WITH STOP MECHANISM
Alfred R. Pursell, Indianapolis, Ind., assignor to The Dow Chemical Company, Midland, Mich., a corporation of Delaware
Filed May 25, 1964, Ser. No. 369,864
5 Claims. (Cl. 73—425.4)

The invention relates to a pipetting device for the filling and controlled emptying of laboratory pipettes and more particularly relates to a syringe-type pump provided with a stop mechanism to facilitate finger control of the dispensing of liquid from a pipette attached to the device.;

Safety engineers have long decried the common practice of drawing liquids into the laboratory pipettes in the manner of drawing a liquid into a soda straw. This manner of filling a pipette is hereinafter referred to as mouth pipetting. Many laboratory workers prefer mouth pipetting because it is relatively easy to acquire good technique in sucking up liquid into the pipette, removing the pipette from the mouth and quickly placing the index finger or the thumb over the upper end of the pipette. Liquid can then be dispensed from the pipette with considerable accuracy and easy control.

Devices provided heretofore for the mechanical filling of pipettes have suffered from the disadvantage that it is difficult to remove the apparatus from the pipette in order to exercise finger control of dispensing of the liquid, or if the liquid is dispensed with the apparatus attached, the apparatus has tended to be cumbersome or incapable of precise control.

It is, therefore, a principal object of the present invention to provide a manual pipette filling device which need not be disconnected from the pipette and which may be operated so as to dispense liquid from the pipette with substantially the same convenience and accuracy of control usually obtained only by direct fingertip control of the pipette.

Another object of the invention is to provide a mechanical pipette filling device which permits dispensing of liquid from the pipette with fingertip control of an aperture in the device itself.

Another object of the invention is to provide a device for filling a pipette which need not be disconnected therefrom in order to dispense an accurately measured volume of liquid from the pipette.

Yet another object of the invention is to provide means for stabilizing the plunger-barrel relationship in a predetermined position in a syringe-type device for filling a pipette.

Figure 5:
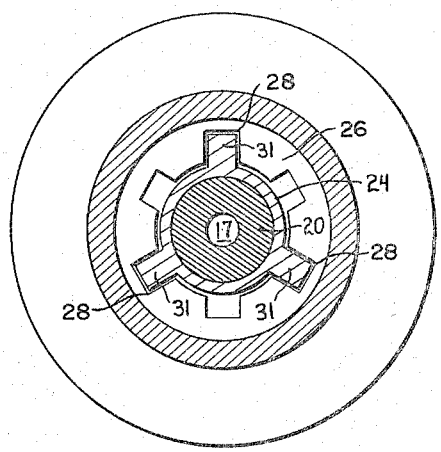
Figure 6:
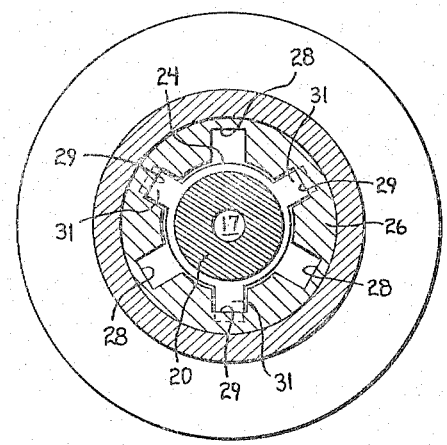
Figure 8:
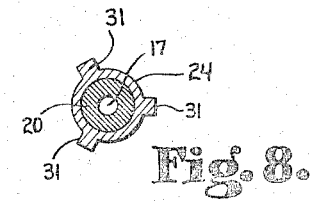
Figure 9:
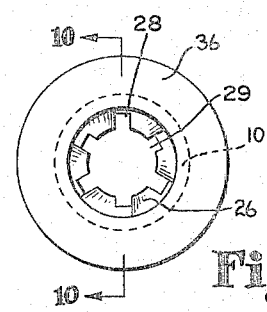
Figure 7:
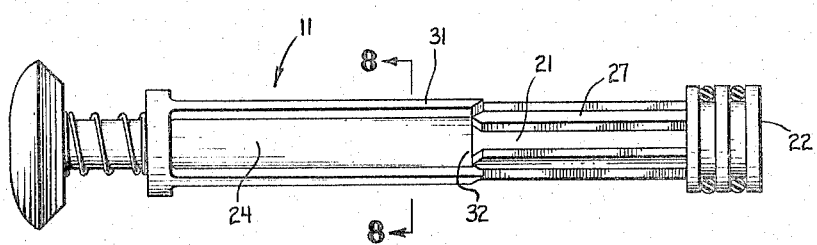

These and other objects and advantages of the present invention will be apparent to those skilled in the art upon becoming familiar with the following specification and claims and the drawings in which like numerals refer to like parts and in which:

FIG. 1 is a view in side elevation, partly in section, showing the syringe-type device with all its parts in extended position and with the springs in the uncompressed state; and FIG. 2 is a sectional view similar to FIG. 1 but with all parts telescoped into the barrel; and FIG. 3 is a sectional view similar to FIG. 1 with the stop mechanism engaged to facilitate positive fingertip control of pipetting; and FIG. 4 is an enlarged view of a section taken along line 4—4 of FIG. 1 showing the relationship of the splined terminal shank portion of the plunger of the syringe in relation to the complementary fluted or grooved ratchet-guide section of the barrel; and FIG. 5 is an enlarged view of a section taken along line 5—5 of FIG. 2 showing the relationship of the grooved ratched-guide section of the barrel to a splined rotatable member which is slidably mounted as a sleeve about the smaller diameter shank portion of the plunger adjacent the finger-engaging end; and FIG. 6 is an enlarged view of a section taken along line 6—6 of FIG. 3 showing the relationship of the grooved ratchet-guide section of the barrel to the smaller diameter shank portion of the plunger on which the sleeve member is slidably mounted; and FIG. 7 is a view in side elevation of the plunger showing the splined rotatable sleeve member forced against the splined terminal shank portion by the spring mounted on the smaller diameter shank portion immediately adjacent the finger-engaging end of the plunger; and FIG. 8 is a sectional view taken along line 8—8 of FIG. 7 showing the relationship of the splined rotatable sleeve member and the smaller diameter shank portion of the plunger on which it is mounted;

FIG. 9 is an end view of the flanged end of the barrel with the plunger removed; and FIG. 10 is a fragmentary view of a section taken along line 10—10 of FIG. 9 showing some of the detail of the grooved ratchet-guide section of the barrel; and FIG. 11 is a perspective view of the grooved ratchet-guide section of the barrel standing as a separate element; and FIGS. 12, 13 and 14 taken together are a sequence of fragmentary views showing the changing positions of the splined rotatable sleeve member of the plunger relative to the splined terminal shank portion of the plunger and to the fluted or grooved ratchet-guide portion of the barrel, only relative portions of each part being shown and the barrel itself being omitted for purposes of illustrating the manner in which the ratchet-pawl mechanism works; and FIG. 15 is a fragmentary sectional view, in part foreshortened, showing another form of barrel closure at the dispensing end of the barrel, and a different form of pipette holder or connector.

Referring more particularly to FIG. 1 in which there is illustrated a complete assembly of the parts of the present pipetting device, there is depicted a syringe consisting of a barrel 10, shown in section, and a plunger shown in full and indicated generally by the numeral 11. Also shown in section is coil spring means 12 which resiliently urges the plunger 11 out of the barrel 10. Attached to the dispensing end 13 of the barrel 10 is a connector 14 having an opening 15 therein for receiving a pipette (not shown) in sealing relationship. If desired, an O-ring 16 may be used to assure a good seal. The plunger 11 is provided with a channel 17 therethrough, shown in dotted outline, which provides communication from the ambient atmosphere through the finger-engaging end 18 of the plunger, through the plunger 11 itself, through the barel 10, through the channel 19 in the dispensing end 13 of the barrel to the pipette receiving opening 15.

The plunger 11 consists of three discrete parts in assembly. The main part consists of a finger-engaging end 18 which is attached to a smaller diameter shank portion 20 which is in turn attached to and formed integrally with a splined terminal shank portion 21. At the very end of the splined terminal shank portion 21 is provided a short cylindrical piston portion 22 which sealingly engages the inner surface of the barrel 10. If desired, one or more O-rings 23 may be employed to improve the sealing engagement of the piston portion 22 with the barrel.

The other two discrete parts of the plunger assembly are mounted on the smaller diameter shank portion 20 and consist of a splined rotatable and slidable sleeve member 24 and coil spring means 25. The spring means 25 is placed adjacent the finger-engaging end 18 so as to urge the sleeve member 24 toward the splined terminal shank portion 21 and into abutment of the splines thereof.

Disposed in the barrel 10 is a cylindrical ratchet-guide portion 26 having a smaller inner diameter than the remainder of the barrel. The spring means 25, the sleeve member 24, the splined terminal shank portion 21 and the ratchet-guide portion 26 of the barrel together form a controllable stop mechanism which is designed to stop the telescoping motion of the plunger 11 at a predetermined position relative to the barrel 10, viz., with the telescoping motion of the sleeve member restrained by the ratchet-guide portion 26.

Referring to FIG. 4, which is an enlarged view of a section taken along line 4—4 of FIG. 1, there is shown the relationship of the splines 27 of the splined terminal shank portion 21 to the longitudinal grooves 28, 29 and intervening lands 30 forming the inside surface of the ratchet-guide portion 26. Also shown in dotted outline is both the height relationship and the radial disposition of the splines 31 of the sleeve member 24. The grooves 29 are deep enough in the radial direction to receive the splines 27 of the terminanl shank portion 21, but are not deep enough to receive the splines 31 of the rotatable sleeve member 24. The grooves 28 are deep enough to receive both the splines 31 as well as the splines 27.

In the assembly shown in FIG. 2, the plunger 11 has been telescoped into the barrel 10, compressing the spring-means 12 and at least partially compressing spring means 25 so as to move the splined terminal shank portion 21 of the plunger 11 into the barrel 10 through and beyond the ratchet-guide portion 26 while the splined sleeve member 24 has entered the ratchet-guide portion 26. The ratchet-guide portion 26 is shown in full.

Referring now more particularly to FIG. 5, there is shown the relationship of the sleeve member 24 and its splines 31 to the ratchet-guide portion 26 and especially to its deeper grooves 28.

The relative disposition of the parts with the stop mechanism in the locked condition is illustrated in FIG. 3 in which the ratchet-guide portion 26 of the barrel is partly broken away to show the distension of the shank of the plunger through the sleeve member 24. As shown, spring means 25 is compressed while the sleeve member 24 is in locking engagement with the ratchet-guide portion 26.

Referring to FIGS. 1, 2 and 3, the edge of the ratchet-guide portion 26 serves as a circular ratchet while the sleeve member 24 serves as a spring actuated pawl. The splines at the end 32 of sleeve member 24 remote from the finger-engaging end 18 of the plunger are cut off or shaped obliquely so as to form pawl teeth 33. These teeth 33 extend beyond the end 32 of the sleeve 24 itself, that is, beyond what constitute very broad grooves between the splines 31, so as to engage the circular ratchet edge 34 of the ratchet-guide portion 26. Each of the pawl teeth 33 is cut obliquely with respect to a circumferential line drawn around the sleeve member 24 at its lower end 32. Each of the teeth 33 are pointed circumferentially in the same direction of rotation. The teeth 35 in the ratchet edge 34 of the ratchet-guide portion 26 have a pitch similar to and complementary to the pitch of the pawl teeth. To minimize friction therebetween when the parts are in use, it is generally preferable to provide pawl teeth with very slightly greater pitch than that of the ratchet teeth, thus minimizing surface to surface contact.

The diameter of the smaller diameter shank portion 20 is less than the inner diameter of the ratchet-guide portion 26, as illustrated in FIG. 6. The relationship of the sleeve member 24 to the smaller diameter shank portion 20, which it surrounds, is more clearly understood with reference to FIG. 8. The ratchet-guide portion 26 of the barrel 10 is further illustrated in FIG. 9. The smaller inside diameter of the ratchet-guide portion 26 and the two different size grooves 28, 29 are illustrated in this view as seen from the flanged end 36 of the barrel 10 with the plunger 11 removed.

The ratchet-guide portion 26 of the barrel 10 may be formed or molded as an integral part of the barrel. However, it is more conveniently made as a separate element such as the article shown in FIG. 11 and cemented or fused in place or otherwise attached to the barrel as illustrated in the fragmentary sectional view in FIG. 10. The ratchet-guide portion 26 standing alone as an element in FIG. 11 is in the form of a foreshortened, substantially cylindrical sleeve which is internally longitudinally grooved in the manner described hereinabove and which has, in addition, ratchet teeth formed at one edge thereof so as to present a toothed edge.

The interaction of the three main parts of the stop mechanism, viz., the ratchet-guide portion 26, the sleeve member 24 and the terminal shank portion 21, will be more clearly understood with particular reference to sequential views FIGS. 12, 13 and 14. When the splines 31 of the sleeve member 24 are forced toward the ratchet-guide portion 26 as shown in FIG. 12, the teeth 33 of the sleeve member engage the teeth 35 of the pawl edge of the ratchet-guide portion 26. The teeth 33 of the sleeve member 24 are normally disposed so that the apices thereof are not aligned with the complementary teeth 35 of the ratchet-guide 26. When the sleeve member 24 is pressed against the ratchet-guide portion 26, the inclined surfaces meet in such a manner that sleeve member 24 is forced to rotate under the pressure. As a consequence, the edge 37 of the tooth 33 of spline 31, which is the side toward the direction of rotation and which is also the side at which the tooth reaches its apex, is brought to bear against the locking side of tooth 35 with the apex of the tooth 33 thrust into the lowest part of the valley next to tooth 35. As a consequence, the spline 31 is aligned with a groove, here groove 28, as shown, which is deep enough to admit the spline 31.

Upon allowing the plunger 11 to move outwardly with respect to the barrel 10 until the sleeve member 24 passes just above the ratchet-guide portion 26, a condition is reached which is illustrated in FIG. 13. As soon as the tooth 33 of spline 31 rises above the apex of tooth 35, tooth 35 no longer prevents sleeve member 24 from rotating and the inverted V-shaped point of spline 27 bearing against the inclined side of tooth 33 causes the sleeve member 24 to rotate so that splines 27 and 31 are no longer aligned. The alignment of splines 27 and 31 is an unstable condition, there always being spring pressure from spring means 25 with or without pressure from the operator's finger. Normally, the splines 27 and 31 are in alignment only in the grooves 28 in the ratchet-guide portion 26.

On again urging the plunger into the barrel in the next sequence of operation, as shown in FIG. 14, tooth 33 of spline 31 contacts the inclined surface of tooth 35 and the inherent action of the inclined surfaces under pressure forces the sleeve member 24 to rotate until the teeth of the ratchet 35 and pawl 33 are again brought into locking engagement. This being a successive depression of the plunger, the spline 31 is not only brought into alignment with a spline 27 but also with a groove 29. However, groove 29 is not deep enough to admit spline 31. The radially outward portion of spline 31 therefore rides on the radially inward edge of the deepest part of groove 29 and the sleeve member 24 is thus prevented from telescoping further into the barrel 10, while the sleeve member 24 is also locked against further rotation by the interaction of teeth 33 and 35. Under these conditions, the plunger 11 is stopped from further telescoping into the barrel 10.

The radially inward edges of the deepest parts of groove 29 must present a sufficient shoulder to support the splines 31 and prevent passage through the ratchet-guide portion 26. Any width shoulder which provides support is sufficient but it is generally desirable to start with a shoulder at least about 1/64 inch in width.

In using the pipetting device of the invention, a pipette is placed in the connector 14, the syringe is grasped, most usually, between the thumb and fingers with the index finger free to operate the plunger 11. The plunger is telescoped into the barrel under the condition wherein the sleeve member 24 has been rotated by the ratchet and pawl mechanism to the position in which thhe splines 31 of the sleeve member will pass through the deeper grooves 28 of the ratchet-guide portion 26 of the barrel. With the plunger depressed, the pipette is inserted into the liquid to be sampled. If it is desired to mix the sample, as is frequently the case in serological work, the plunger is reciprocated up and down several times with the index finger maintained sealingly over hole 38, care being taken not to allow the plunger to move out of the barrel sufficiently that the teeth 33 of the sleeve member 24 move outwardly and beyond the ratchet-guide portion 26, else the sleeve member 24 will rotate and on being further pressed against the ratchet-guide portion 26 will engage and lock. To next fill the pipette, the plunger 11 is depressed well down in the barrel 10, the index finger is placed sealingly over the hole 38 in the finger-engaging end of the plunger and the plunger is allowed to rise under the urging of spring means 12 until the liquid sample rises above the selected graduated mark on the pipette. Then the index finger is momentarily rolled aside from opening 38, to prevent overfilling into the pipetting device, while the plunger is allowed to move outwardly from the barrel until the sleeve member 24 is completely above the ratchet-guide portion 26. The plunger is again depressed immediately causing the sleeve member 24 to rotate into locking engagement with ratchet-guide portion 26. The index finger is then quickly positioned over the opening 38 in the plunger so as to retain the sample in the pipette. The pipette is then raised out of the liquid while the plunger is kept in the locked position by pressure of the index finger. With the device in this stable configuration, the operator may then conveniently proceed to dispense liquid from the pipette, exercising fingertip control in substantially the same manner as he would if his fingertip were on the top of the pipette itself. Alternatively, the measured amount of liquid may be caused to deliver from the pipette by allowing the plunger to raise, disengaging the stop mechanism, and then placing a finger over the channel opening and depressing the plunger into the barrel until all the liquid is forced out of the pipette. The pipette is thus used as a blow-out pipette.

The pipetting device may be made of any appropriate materials of construction as desired. The plunger and the barrel may be made of glass or metal or plastic while the springs are made of spring metal, preferably a corrosion resistant steel. The pipette connector may be of any convenient design, for example, the connector 14 illustrated in FIGS. 1, 2 and 3, which is of a chuck type, easily loosened to release the pipette and quickly tightened. Firm tightening assures a good seal. If desired, a different form of connector may be used such as the connector 39 shown in FIG. 15. The connector 39 may be made of rigid metal or polymeric material or a flexible elastomeric material may be used and the O-rings omitted.

The closure of the barrel at the dispensing end 13 may be integral, or may constitute a threadable plug 40, of the type shown in FIG. 15. It is generally desirable to employ a biological filter 41 disposed so as to filter all fluids passing through the channel 19 in the dispensing end of the barrel 11.

Among the advantages of the invention are (1) the ease of using the device in a fume hood, and (2) the durability of the device since the design permits critical parts to be made from materials of construction which are substantially resistant to the corrosive action of the fumes of most aqueous solutions.

The apparatus of the invention having been thus described, various modifications thereof will at once be apparent to those skilled in the art, and the scope of the invention is to be considered limited only by the scope of the claims hereinafter appended.

I claim:

1. In combination with a syringe comprising a plunger and an associated barrel, spring means urging the plunger out of the barrel and a connector attached to the dispensing end of the barrel and adapted to receive the end portion of a pipette in sealing relation, said plunger having a piston end portion receivable in sliding, sealing engagement by said barrel, and said plunger having a channel formed therethrough from the finger-engaging top to the opposite end thereby to permit finger tip control of delivery of liquid from a pipette attached to said connector: a controllable stop mechanism which stops telescoping movement of the plunger into the barrel at a predetermined position of the plunger relative to the barrel during predetermined strokes of the plunger into the barrel, said stop mechanism comprising:

a splined terminal shank portion formed on said plunger;

a smaller diameter smooth cylindrical shank portion formed on the plunger, said smaller diameter shank portion connecting the finger-engaging end of the plunger with the splined terminal shank portion;

a splined rotatable sleeve member slidably mounted on said smaller diameter shank portion, the splines on the terminal shank portion having substantially the same width as the splines on the sleeve member, the number of splines on the terminal shank portion being twice the number of splines on the sleeve member, and the splines on the sleeve member extending radially from the axis of the plunger at least about 1/64 inch more than the splines of the terminal shank portion;

a compressible spring surrounding the smaller diameter shank portion between the finger-engaging end and the sleeve member and adapted to urge the sleeve member away from the finger-engaging end;

and a cylindrical ratchet-guide portion formed on the inside of the barrel adjacent the flanged end thereof and on a common axis therewith and having a smaller inner diameter than the remainder of the barrel, said ratchet-guide portion having longitudinal lands and grooves, the grooves equalling the splines of the said terminal shank portion in number, alternate grooves being deep enough to permit passage of the splines of the terminal shank portion through the ratchet-guide portion but not passage of the splines of the said rotatable sleeve member, the rest of the grooves being deep enough to permit passage of the splines of the rotatable sleeve member; the end of the ratchet-guide portion nearest the flanged end of the barrel being toothed and comprising a circular pawl, the number of teeth of the pawl equalling the number of splines on the terminal shank portion, and the longitudinal internal grooves of the ratchet-guide portion being aligned with the deepest part of each notche between the teeth of the pawl edge; the splines on the rotatable sleeve member having ends projecting beyond the intervening grooves of the rotatable sleeve member and towards the terminal shank portion, said ends being cut obliquely with respect to a circumferential line drawn around the rotatable sleeve member, the pitch of the cut being slightly greater and substantially complementary to the pitch of the teeth of the pawl end of the circular ratchet-guide portion of the barrel; and the end of each spline of the terminal shank portion facing the rotatable sleeve member having an inverted V-shaped pointed end with respect to a circumferential line drawn around the terminal shank portion;

said splined terminal shank portion, said splined rotatable, slidable sleeve member, said compressible spring and said cylindrical ratchet-guide portion together comprising the controllable stop mechanism.

2. The apparatus as in claim 1 in which the rotatable sleeve member has three splines and the terminal shank portion has six splines.

3. The apparatus as in claim 1 in which the cylindrical ratchet-guide portion of the barrel is separately formed as a substantially cylindrical shell end, and is thereafter placed inside the barrel and attached thereto.

4. The improved apparatus for filling a pipette and dispensing liquid therefrom which comprises:

a syringe comprising a plunger, an associated barrel and spring means urging the plunger out of the barrel and a connector attached to the dispensing end of the barrel and adapted to receive the end portion of a pipette in sealing relation and in communication with the dispensing end of the barrel;

said plunger having a splined terminal shank portion, a finger-engaging end and a smaller diameter, smooth, cylindrical shank portion connecting the finger-engaging end of the plunger with the splined terminal portion, said plunger having a channel formed therethrough from the finger-engaging top to the opposite end of said splined terminal shank portion thereby to provide communication from the finger-engaging top through the plunger, through the barrel, through the dispensing end of the barrel, through the connector to a pipette held by the connector;

a splined, rotatable sleeve member slidably mounted on the smaller diameter shank portion of the plunger, the splines on the terminal shank portion having substantially the same width as the splines on the sleeve member, the number of splines on the terminal shank portion being twice the number of splines on the sleeve member, the splines on the sleeve member extending radially from the axis of the plunger at last about $\frac{1}{64}$ inch more than the splines of the terminal shank portion, and the splines on the sleeve member having ends projecting beyond the intervening grooves of the rotatable sleeve member and toward the terminal shank portion, said ends being cut obliquely with respect to a circumferential line drawn around the sleeve member and the ends of the splines of the terminal shank portion facing the rotatable sleeve member having inverted V-shaped pointed ends with respect to a circumferential line drawn around the terminal shank portion;

a compressible spring surrounding the smaller diameter shank portion between the finger-engaging end of the plunger and the sleeve member and adapted to urge the sleeve member away from the finger-engaging end;

said barrel having a cylindrical ratchet-guide portion, said ratchet-guide portion having a smaller diameter than the remainder of the barrel, said ratchet-guide portion having longitudinal lands and grooves, the grooves equalling the splines of the terminal shank portion in number, alternate grooves being deep enough to permit passage of the splines of the terminal shank portion through the ratchet-guide portion but not passage of the splines of the rotatable sleeve member, the rest of the grooves being deep enough to permit passage of the splines of the rotatable sleeve member; the end of the ratchet-guide portion nearest the flanged end of the barrel being toothed and comprising a circular pawl, the number of teeth of the pawl equalling the number of splines on the terminal shank portion, and the longitudinal internal grooves of the ratchet-guide portion being aligned with the deepest part of each notch between the teeth of the pawl edge, the pitch of the cut of the teeth of the pawl edge being slightly less and substantially complementary to the pitch of the teeth of the sleeve member.

5. The method of safely filling a laboratory pipette with a liquid and dispensing a measured volume of said liquid therefrom, said pipette having ends, a dispensing tip end and an upper end, which comprises:

sealingly attaching the upper end of the pipette by means of a hollow connector to a syringe-like pipette filling device, said device having a plunger, a barrel in which the plunger reciprocates, spring means resiliently urging the plunger out of the barrel, controllable stop means adapted to stop telescoping movement of the plunger into the barrel at a predetermined position, a finger-engaging end of the plunger, and a channel through the plunger from the finger-engaging end to the end opposite inside the barrel, said channel connecting with the interior of the barrel, the opening in the dispensing end of the barrel, the connector, and the opening in the upper end of the pipette;

depressing the said plunger into the barrel of the device by finger pressure;

manually inserting the pipette into the liquid to be sampled;

placing a finger sealingly over the channel opening in the finger-engaging end of the plunger and allowing the plunger to move outwardly from the barrel under the urging of the spring means until the pipette is filled at least slightly above a preselected level;

removing the finger from the channel opening while bringing the stop mechanism into engagement;

sealing the channel opening with the finger;

manually raising the pipette and device out of the liquid while retaining the finger over the channel opening;

by adjustment of finger pressure on the channel opening, controllably releasing liquid from the pipette until the liquid level drops to the preselected graduation mark;

and causing the measured amount of liquid to deliver from the pipette.

References Cited by the Examiner

UNITED STATES PATENTS 2,409,656   10/1946   Austin _____ 128—218

FOREIGN PATENTS 512,405   5/1955   Canada.
914,790   8/1954   Germany.
239,388   9/1925   Great Britain.

LOUIS R. PRINCE, *Primary Examiner.*

DANIEL M. YASICH, *Assistant Examiner.*